(12) United States Patent
Lee et al.

(10) Patent No.: US 10,199,870 B2
(45) Date of Patent: Feb. 5, 2019

(54) HOME APPLIANCE

(71) Applicant: LG ELECTRONICS INC., Seoul (KR)

(72) Inventors: Soongkeun Lee, Seoul (KR); Hoyong Jang, Seoul (KR); Chungill Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 158 days.

(21) Appl. No.: 15/171,284

(22) Filed: Jun. 2, 2016

(65) Prior Publication Data

US 2016/0359372 A1 Dec. 8, 2016

(30) Foreign Application Priority Data

Jun. 3, 2015 (KR) ........................ 10-2015-0078812

(51) Int. Cl.
*H02J 3/00* (2006.01)
*H04B 5/00* (2006.01)
(Continued)

(52) U.S. Cl.
CPC .............. *H02J 50/12* (2016.02); *G09G 5/003* (2013.01); *H02J 7/025* (2013.01); *H02J 50/15* (2016.02);
(Continued)

(58) Field of Classification Search
CPC .. H02J 50/10; H02J 50/12; H02J 50/15; H02J 50/80; H02J 5/00; H02J 7/025; G09G 5/003; H02P 27/08; H04W 4/008; D06F 33/02; H04G 5/0025; H04G 5/0031; H04G 5/0037; H04G 5/0075; H04G 5/0093
(Continued)

(56) References Cited

U.S. PATENT DOCUMENTS

2012/0023681 A1* 2/2012 Park ........................ D06F 33/02
8/137
2012/0144872 A1* 6/2012 Kappler .................. D06F 33/02
68/12.02
(Continued)

FOREIGN PATENT DOCUMENTS

JP H08-084891 4/1996
JP 2008-132257 6/2008

OTHER PUBLICATIONS

Korean Office Action dated Apr. 6, 2016 issued in Application No. 10-2015-0078812.
(Continued)

*Primary Examiner* — Hal Kaplan
(74) *Attorney, Agent, or Firm* — KED & Associates, LLP

(57) ABSTRACT

A home appliance is disclosed, including a motor, a drive unit configured to drive the motor, a first circuit unit including a main controller configured to control the drive unit, a display unit, and a second circuit unit including a display controller configured to control the display unit. The first circuit unit transmits wireless power to the second circuit unit, using a first frequency, and the second circuit unit transmits data to the first circuit unit, using a second frequency different from the first frequency. Thereby, wireless power transmission and bidirectional communication are performed between the first and second circuit units.

16 Claims, 15 Drawing Sheets

(51) Int. Cl.
*H02J 50/12* (2016.01)
*H04W 4/80* (2018.01)
*H02J 7/02* (2016.01)
*H02J 50/80* (2016.01)
*H02J 50/15* (2016.01)
*G09G 5/00* (2006.01)
*H02P 27/08* (2006.01)

(52) U.S. Cl.
CPC .............. *H02J 50/80* (2016.02); *H02P 27/08* (2013.01); *H04B 5/0031* (2013.01); *H04B 5/0037* (2013.01); *H04B 5/0093* (2013.01); *H04W 4/80* (2018.02)

(58) Field of Classification Search
USPC .......................................................... 307/31
See application file for complete search history.

(56) References Cited

U.S. PATENT DOCUMENTS

| | | |
|---|---|---|
| 2013/0026847 A1 | 1/2013 | Kim et al. |
| 2013/0055770 A1* | 3/2013 | Kim ...................... D06F 39/003 |
| | | 68/139 |
| 2013/0134793 A1 | 5/2013 | Ryu et al. |
| 2013/0239336 A1* | 9/2013 | Kim ........................ D06F 33/02 |
| | | 8/137 |

OTHER PUBLICATIONS

European Search Report dated Oct. 26, 2016 issued in Application No. 16172371.3.

* cited by examiner

HOME APPLIANCE

CROSS-REFERENCE TO RELATED APPLICATION(S)

The present application claims the benefit of priority under 35 U.S.C. 119 to Korean Patent Application No. 10-2015-0078812, filed on Jun. 3, 2015 in the Korean Intellectual Property Office, the disclosure of which is incorporated herein by reference.

BACKGROUND

1. Field

The present invention relates to a home appliance and, more particularly, to a home appliance capable of performing wireless power transmission and bidirectional communication between circuit units.

2. Background

Home appliances refer to apparatuses used at home, such as a laundry treatment machine and a refrigerator, and accomplish operations such as laundry treatment, food refrigeration, freezing, etc., based on rotation of a motor, for users.

With advances in various communication schemes and advances in various display schemes, a study on adding functions for user convenience to the home appliances has been conducted.

An object of the present invention is to provide a home appliance capable of performing wireless power transmission and bidirectional communication between circuit units.

The objects of the present invention are not limited to what has been particularly described hereinabove and other objects not described herein will be more clearly understood by persons skilled in the art from the following description.

In accordance with one embodiment of the present invention, the above and other objects can be accomplished by the provision of a home appliance including a motor, a drive unit configured to drive the motor, a first circuit unit including a main controller configured to control the drive unit, a display unit, and a second circuit unit including a display controller configured to control the display unit, wherein the first circuit unit transmits wireless power to the second circuit unit, using a first frequency, and the second circuit unit transmits data to the first circuit unit, using a second frequency different from the first frequency.

In accordance with another embodiment of the present invention, the above and other objects can be accomplished by the provision of a home appliance including a motor, a drive unit configured to drive the motor, a first circuit unit including a main controller configured to control the drive unit, a display unit, a door configured to be opened or closed, and a second circuit unit including a display controller configured to control the display unit, the second circuit being attached to the door and receiving wireless power from the first circuit unit.

Details of other embodiments are included in the following description and the drawings.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Reference will now be made in detail to the preferred embodiments of the present invention, examples of which are illustrated in the accompanying drawings.

The suffixes "module" and "unit" in elements used in description below are given only in consideration of ease in preparation of the specification and do not provide specific meanings or functions. Therefore, the suffixes "module" and "unit" may be used together.

A laundry treatment machine described in the present disclosure is an apparatus which is capable of estimating the position of a rotor of a motor for rotating a washtub in a sensorless manner without being provided with a sensor for sensing the position of the rotor of the motor. Hereinafter, a laundry treatment machine of a sensorless type will be described.

Figure 1:
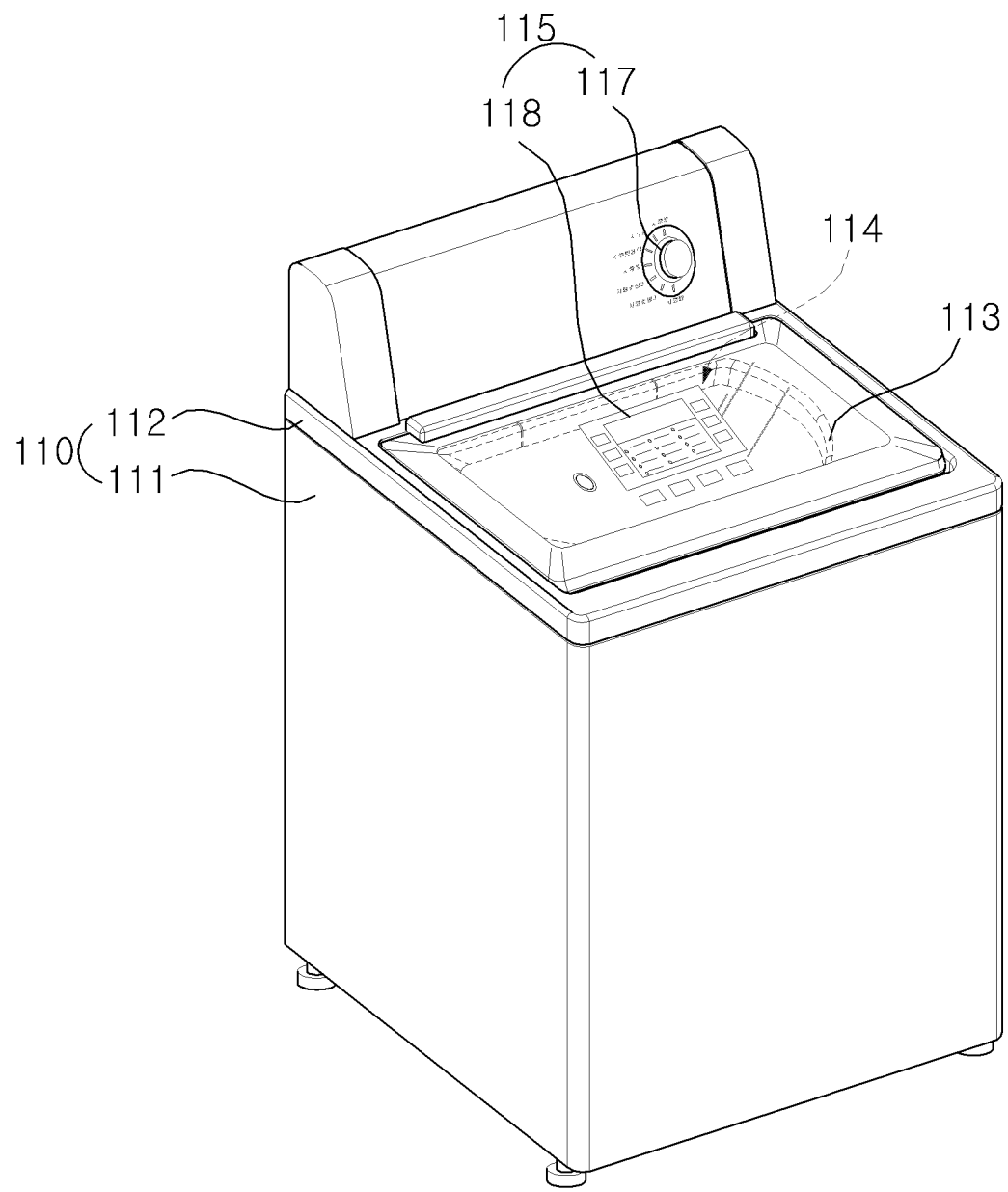
FIG. 1 is a perspective view showing a laundry treatment machine, which is an exemplary home appliance, according to an embodiment of the present invention.
Figure 2:
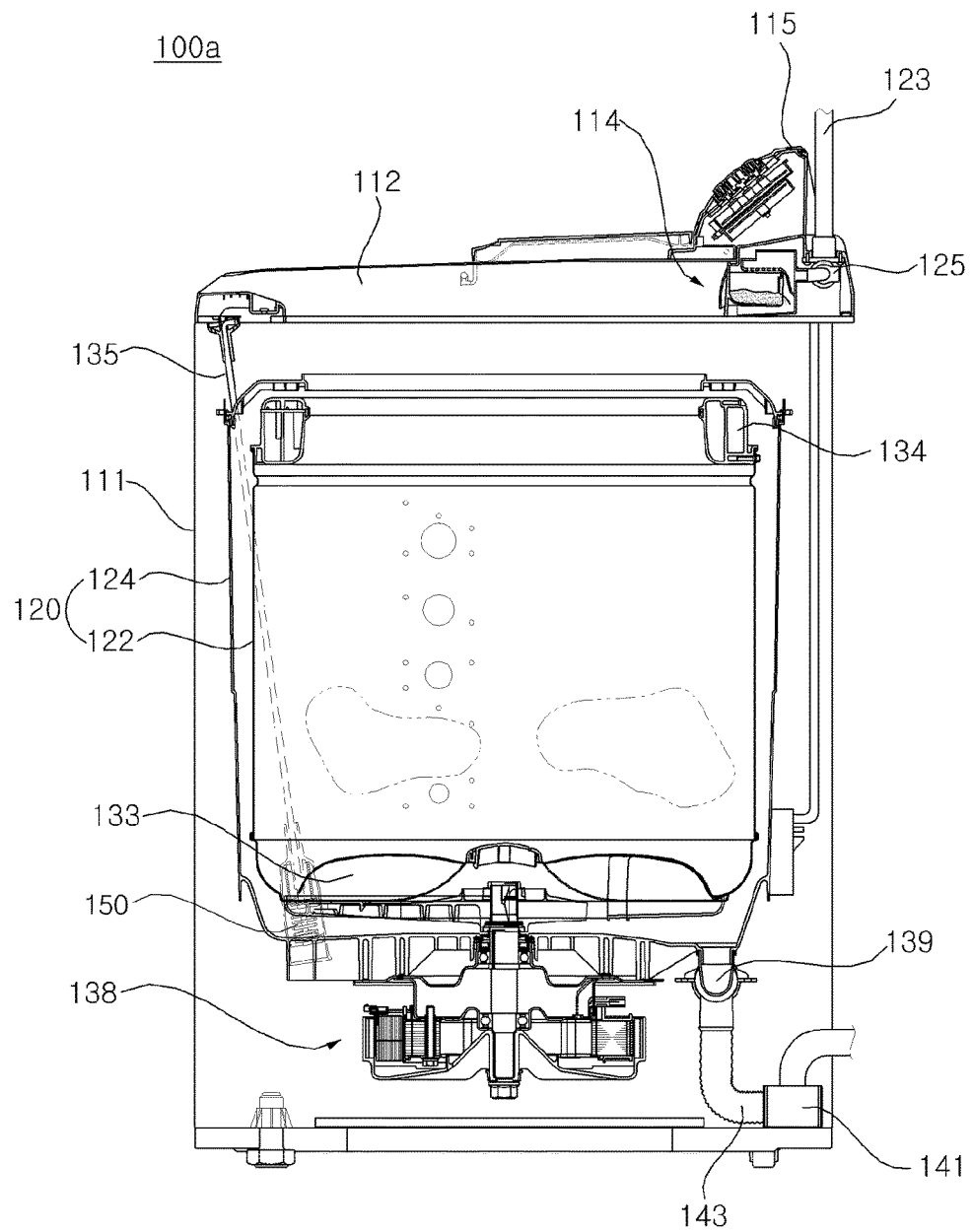
FIG. 2 is a side sectional view of the laundry treatment machine of FIG. 1.

FIG. 1 is a perspective view showing a laundry treatment machine, which is an exemplary home appliance, according to an embodiment of the present invention and FIG. 2 is a side sectional view of the laundry treatment machine of FIG. 1.

Referring to FIGS. 1 and 2, a laundry treatment machine 100a, which is an exemplary home appliance, according to an embodiment of the present invention is a top load type laundry treatment machine configured such that laundry is introduced into a washtub from above. Such a top load type laundry treatment machine includes a washing machine that implements washing, rinsing, and dehydration of laundry introduced thereinto and a drying machine that dries wet laundry introduced thereinto. The following description will be given focusing on the washing machine.

The washing machine 100a includes a casing 110 forming the external appearance of the washing machine 100a, a control panel 115 that includes an input unit 117 to receive a variety of control instructions from a user and a display unit to display information regarding an operational state of the washing machine 100a and thus provides a user interface, and a door 113 hinged to the casing 110 to open and close a laundry introduction opening through which laundry is introduced and removed.

The casing 110 may include a main body 111 defining a space in which a variety of components of the washing machine 100a may be accommodated and a top cover 112 which is provided at the upper side of the main body 111, the top cover defining the laundry introduction opening through which laundry is introduced into an inner tub 122.

The casing 110 is described as including the main body 111 and the top cover 112. However, the casing 110 is not limited thereto and any other casing configuration defining the external appearance of the washing machine 100a may be used.

Meanwhile, a support rod 135 will be described as being coupled to the top cover 112 that constitutes the casing 110. However, the support rod 135 is not limited thereto and may be coupled to any fixed portion of the casing 110.

The control panel 115 includes the input unit 117 to manipulate an operational state of the washing machine 100a and the display unit 118 located at one side of the input unit 117 to display an operational state of the washing machine 100a.

The door 113 is used to open and close the laundry introduction opening (not shown) formed in the top cover 112. The door 113 may include a transparent member, such as tempered glass, to allow the user to see the interior of the main body 111.

Meanwhile, in relation to an embodiment of the present invention, the control panel 115 may be located on the door 113.

Alternatively, only a part of the control panel 115 may be located on the door 113.

For example, the display unit 118 and a circuit unit for controlling the display unit 118 may be located on the door 113. Meanwhile, the input unit 117 may further be located on the door 113 configured to be opened and closed.

If at least one of the display unit 118 and the input unit 117 are located on the door 113 configured to be opened and closed, a display controller (not shown) for signal processing of the display unit 118 or the input unit 117 should be arranged in the proximity of the display unit 118 or the input unit 117.

Therefore, the display controller is desirably located on the door 113. If a circuit unit (not shown), such as a circuit board (not shown), including the display controller (not shown) is located on the door 113 configured to be opened and closed, wires should be connected to additionally supply a drive power voltage to the circuit unit (not shown).

However, when the wires are connected to the circuit unit (not shown) attached to the door 113 configured to be opened and closed, the wires may wear down and may deteriorate aesthetics.

Accordingly, the present invention adopts a wireless power transmission scheme during supply of a power voltage to the circuit unit (not shown) attached to the door 113 configured to be opened and closed. The wireless power transmission scheme will be described later with reference to FIGS. 3 to 6.

The washing machine 100a may include a washtub 120. The washtub 120 may consist of an outer tub 124 for containing wash water and an inner tub 122 for accommodating laundry, the inner tub 122 being rotatably mounted in the outer tub 124. A balancer 134 may be provided in an upper region of the washtub 120 to compensate for eccentricity generated during rotation of the washtub 120.

The washing machine 100a may further include a pulsator 133 rotatably mounted at a lower part of the washtub 120.

A drive device 138 serves to supply drive power required to rotate the inner tub 122 and/or the pulsator 133. A clutch (not shown) may be provided to selectively transmit drive power of the drive device 138 such that only the inner tub 122 is rotated, only the pulsator 133 is rotated, or both the inner tub 122 and the pulsator 133 are simultaneously rotated.

Figure 3:
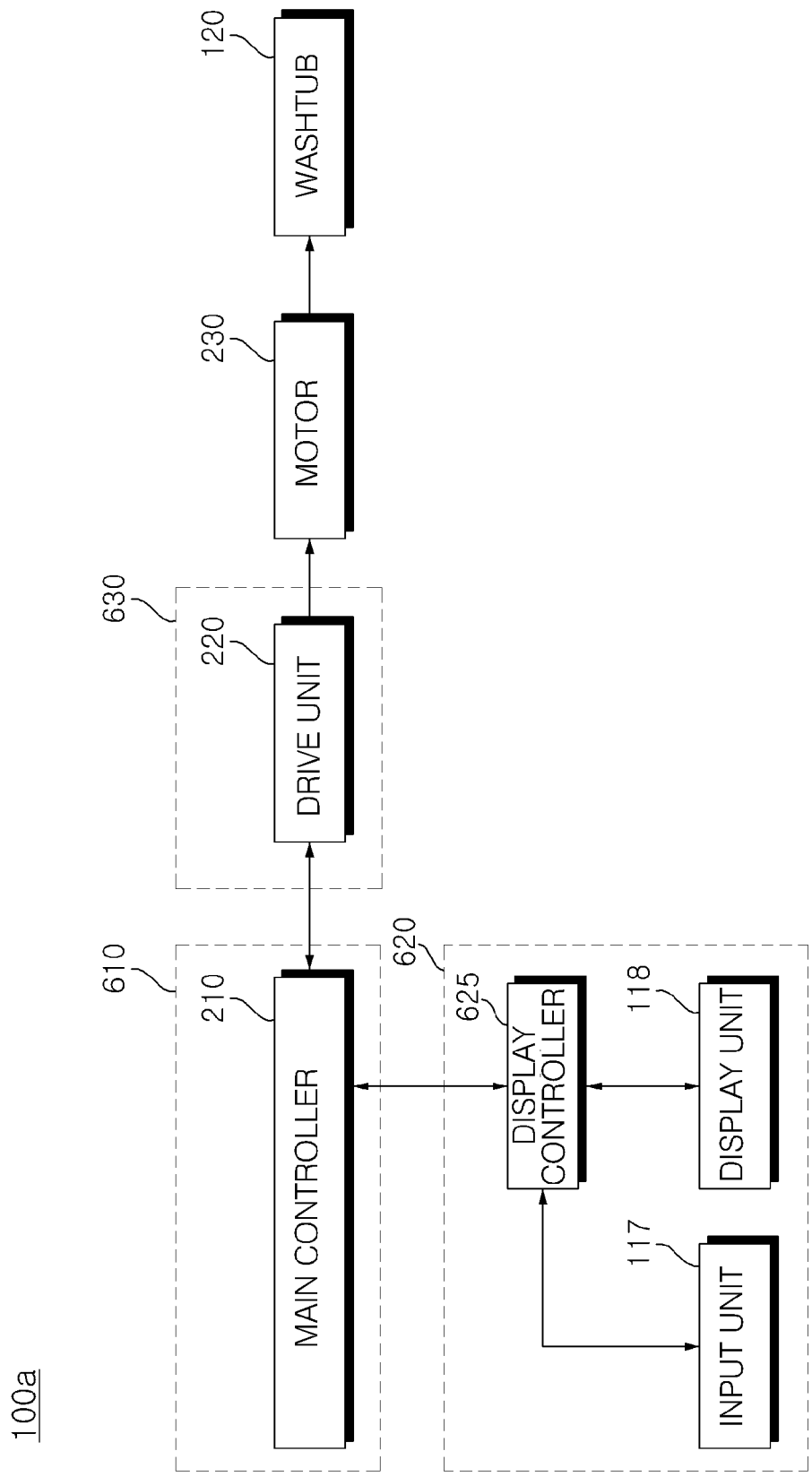
FIG. 3 is a block diagram of the inner configuration of the laundry treatment machine of FIG. 1.

The drive device 138 is operated by a drive unit 220 of FIG. 3, i.e., a drive circuit. This will be described later with reference to FIG. 3 and the following drawings.

Meanwhile, the top cover 112 is provided with a detergent box 114, in which a variety of additives such as detergent for washing, fabric conditioner, and/or bleach are accommodated, so as to be pulled away from or pushed towards the top cover 112. Wash water supplied through a water supply passageway 123 is supplied into the inner tub 122 by way of the detergent box 114.

The inner tub 122 has a plurality of holes (not shown) such that wash water supplied into the inner tub 122 flows to the outer tub 124 through the holes. A water supply valve 125 may be provided to control the flow of wash water through the water supply passageway 123.

Wash water in the outer tub 124 is discharged through a water discharge passageway 143. A water discharge valve 139 to control the flow of wash water through the water discharge passageway 143 and a water discharge pump 141 to pump wash water may be provided.

The support rod 135 serves to suspend the outer tub 124 from the casing 110. One end of the support rod 135 is connected to the casing 110 and the other end of the support rod 135 is connected to the outer tub 124 via a suspension 150.

The suspension 150 serves to attenuate vibration of the outer tub 124 during operation of the washing machine 100. For example, the outer tub 124 may vibrate as the inner tub 122 is rotated. During rotation of the inner tub 122, the suspension 150 may attenuate vibration caused by various factors, such as eccentricity of laundry accommodated in the inner tub 122, the rate of rotation, and resonance of the inner tub 122.

FIG. 3 is a block diagram of the inner configuration of the laundry treatment machine of FIG. 1.

Referring to FIG. 3, the laundry treatment machine 100a may include a first circuit unit 610 including a main controller 210, a second circuit 620 including a display controller 625, the display unit 118, and the input unit 117, and a third circuit 630 including a drive unit 220.

The first circuit unit 610 and the third circuit 630 may be integrated into one circuit.

The display controller 625 may control the input unit 117 to manipulate an operational state of the laundry treatment machine 100a and the display unit 118 to display the operational state of the laundry treatment machine 100a.

The drive unit 220 is controlled under control of the main controller 210 and drives a motor 230. Thus, the washtub 120 is rotated by the motor 230.

The main controller 210 is operated upon receiving an operating signal input by the input unit 117. Thereby, washing, rinsing, and dehydration processes may be implemented.

In addition, the main controller 210 may control the display unit 118 to display washing courses, washing time, dehydration time, rinsing time, current operational state, and the like.

The main controller 210 may also control the drive unit 220 to operate the motor 230. In this case, a sensor to sense the position of a rotor of the motor 230 is not provided at the interior or exterior of the motor 230. That is, the drive unit 220 controls the motor 230 in a sensorless manner.

The drive unit 220, which serves to drive the motor 230, may include an inverter, an inverter controller, an output current detector (E of FIG. 4) to detect output current $i_o$ flowing into the motor 230, and an output voltage detector to detect an output voltage $v_o$ applied to the motor 230. In addition, the drive unit 220 may further include a converter to supply a Direct Current (DC) power voltage input to the inverter.

For example, the inverter controller (430 of FIG. 4) of the drive unit 220 estimates the position of the rotor of the motor 230, based on the output current $i_o$ and the output voltage vo. In addition, the inverter controller (430 of FIG. 4) controls rotation of the motor 230 based on the estimated position of the rotor of the motor 230.

More specifically, if the inverter controller (430 of FIG. 4) outputs a Pulse Width Modulation (PWM) based switching control signal (Sic of FIG. 4) to the inverter based on the output current $i_o$ and the output voltage vo, the inverter may supply an Alternating Current (AC) power voltage having a predetermined frequency to the motor 230 through a fast switching operation. The motor 230 is then rotated by the AC power voltage of the predetermined frequency.

The drive unit 220 will be described later with reference to FIG. 4.

Figure 4:
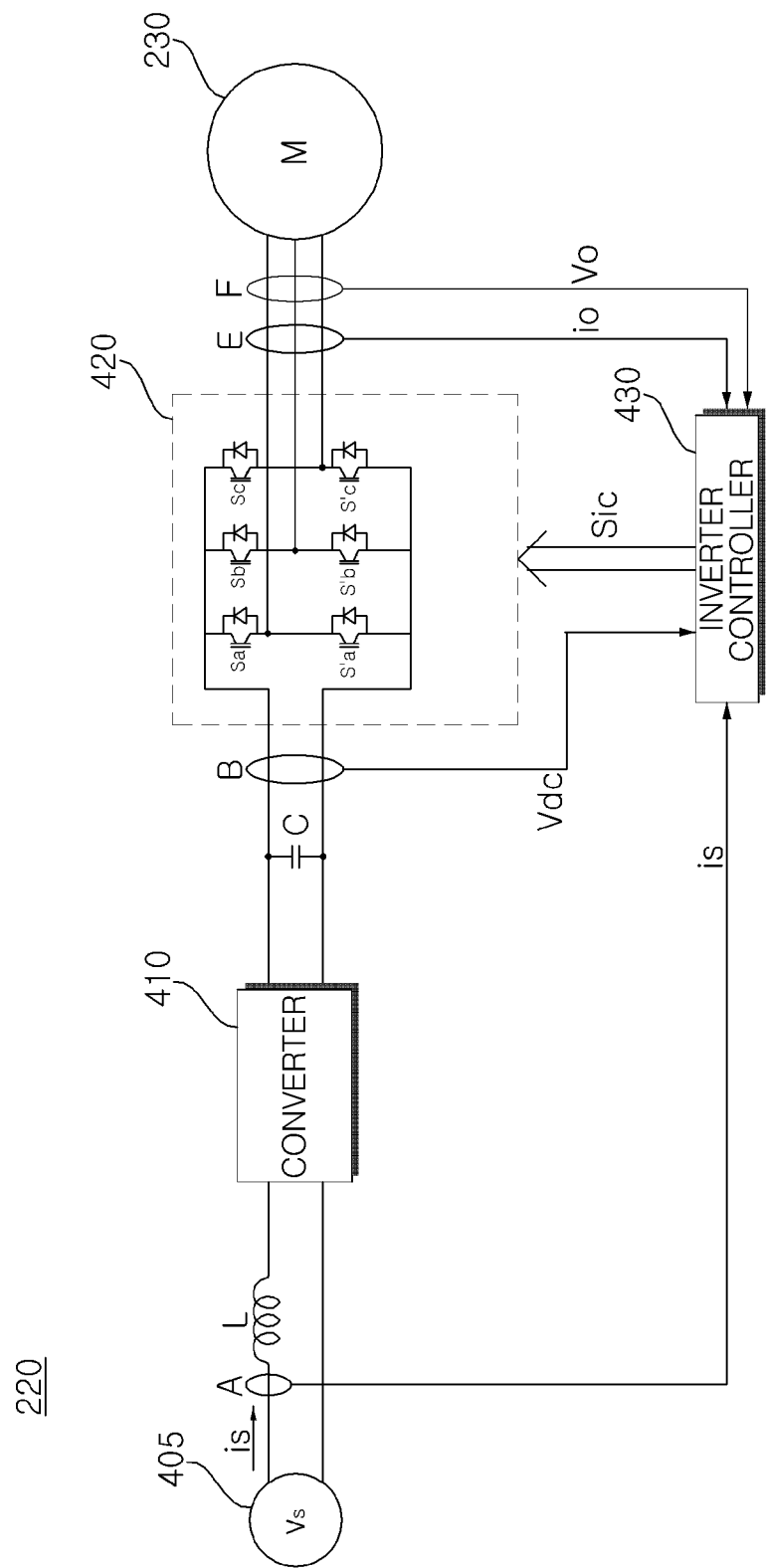
FIG. 4 is a circuit diagram of the inner configuration of the drive unit shown in FIG. 3.

Meanwhile, the main controller 210 may detect laundry quantity based on the current $i_o$ detected by the output current detector (E of FIG. 4). For example, the main controller 210 may detect laundry quantity based on the current $i_o$ of the motor 230 during rotation of the washtub 120.

The main controller 210 may also detect eccentricity of the washtub 120, i.e., unbalance (UB) of the washtub 120. Detection of eccentricity may be performed based on ripple components of the current $i_o$ detected by the output current detector (E of FIG. 4) or variation in the rate of rotation of the washtub 120.

FIG. 4 is a circuit diagram of the inner configuration of the drive unit shown in FIG. 3.

Referring to FIG. 4, the drive unit 220 according to an embodiment of the present invention serves to drive a motor of a sensorless scheme and may include a converter 410, an inverter 420, an inverter controller 430, a DC terminal voltage detector B, a smoothing capacitor C, an output current detector E. The drive unit 220 may further include an input current detector A and a reactor L.

The reactor L is located between a commercial AC power source (vs) 405 and the converter 410 to perform power factor correction or boosting. In addition, the reactor L may function to restrict harmonic current caused by fast switching.

The input current detector A may detect input current $i_s$ input from the commercial AC power source 405. To this end, a Current Transformer (CT), a shunt resistor, etc. may be used as the input current detector A. The detected input current $i_s$ may be a discrete pulse signal and may be input to the inverter controller 430.

The converter 410 converts an AC power voltage, output from the commercial AC power source 405 via the reactor L into a DC power voltage. Although FIG. 4 illustrates the commercial AC power source 405 as a single phase AC power source, the commercial AC power source 405 may be a three-phase AC power source. Depending on the type of the commercial AC power source 405, the internal configuration of the converter 410 varies.

The converter 410 may consist of diodes without switching elements to perform rectification without a switching operation.

For example, when the AC power source 405 is a single phase AC power source, the converter 410 may include four diodes of a bridge type and, when the AC power source 405 is a three-phase AC power source, the converter 410 may include six diodes of a bridge type.

Alternatively, the converter 410 may be a half bridge type converter in which two switching elements and four diodes are interconnected. When the AC power source 405 is a three-phase AC power source, the converter 410 may include six switching elements and six diodes.

If the converter 410 includes switching elements, the converter 410 may perform boosting, power factor correction, and DC power voltage conversion via switching by the switching elements.

The smoothing capacitor C implements smoothing of an input voltage and stores the smoothed voltage. Although FIG. 4 illustrates a single smoothing capacitor C, a plurality of smoothing capacitors may be provided to achieve stability.

Although the smoothing capacitor C is shown as being connected to an output terminal of the converter 410 in FIG. 4, the present invention is not limited thereto and a DC power voltage may be directly input to the smoothing capacitor C. For example, a DC power voltage from a solar battery may be directly input to the smoothing capacitor C or may be input to the smooth capacitor C through DC/DC conversion. The following description will be given focusing on illustrated parts of FIG. 4.

Both terminals of the smoothing capacitor C store a DC power voltage and thus may be referred to as DC terminals or DC link terminals.

The DC terminal voltage detector B may detect a DC terminal voltage Vdc across both terminals of the smoothing capacitor C. To this end, the DC terminal voltage detector B may include a resistor, an amplifier, etc. The detected DC terminal voltage Vdc may be a discrete pulse signal and may be input to the inverter controller 430.

The inverter 420 may include a plurality of inverter switching elements and convert a DC power voltage Vdc smoothed by an on/off operation of the switching elements into three-phase AC power voltages va, vb, and vc having predetermined frequencies to thereby output the same to the three-phase synchronous motor 230.

The inverter 420 includes a pair of an upper arm switching element Sa and a lower arm switching element S'a which are serially connected, a pair of an upper arm switching element Sb and a lower arm switching element S'b which are serially connected, and a pair of an upper arm switching element Sc and a lower arm switching element S'c which are serially connected. A total of three pairs of upper and lower arm switching elements Sa and S'a, Sb and S'b, and Sc and S'c are connected in parallel. Diodes are connected in anti-parallel to the respective switching elements Sa, S'a, Sb, S'b, Sc, and S'c.

The switching elements included in the inverter 420 are respectively turned on or off based on the inverter switching control signal Sic from the inverter controller 430. Thereby, the three-phase AC power voltages having predetermined frequencies are output to the three-phase synchronous motor 230.

The inverter controller 430 may control a switching operation of the inverter 420 based on a sensorless scheme. To this end, the inverter controller 430 may receive the output current $i_o$ detected by the output current detector E and the output voltage $v_o$ detected by the output voltage detector F.

To control the switching operation of the inverter 420, the inverter controller 430 outputs the inverter switching control signal Sic to the inverter 420. The inverter switching control signal Sic is a PWM switching control signal and is generated based on the output current value $i_o$ detected by the output current detector E and the output voltage $v_o$ detected by the output voltage detector F. A detailed description related to output of the inverter switching control signal Sic in the inverter controller 430 will be given later with reference to FIG. 5.

The output current detector E detects the output current $i_o$ flowing between the inverter 420 and the three-phase motor 230. That is, the output current detector E may detect all output currents $i_a$, $i_b$, and $i_c$ of the respective phases of the motor 230. Alternatively, the output current detector E may detect output currents of two phases using three-phase balance.

The output current detector E may be located between the inverter 420 and the motor 230. To detect current, a CT, a shunt resistor, etc. may be used as the output current detector E.

When shunt resistors are used, three shunt resistors may be located between the inverter 420 and the synchronous motor 230 or either terminals of the three shunt resistors may be connected to the three lower arm switching elements S'a, S'b, and S'c of the inverter 420. Meanwhile, two shunt resistors may be used based on three-phase balance. Alternatively, when a single shunt resistor is used, the shunt resistor may be located between the above-described capacitor C and the inverter 420.

The detected output current $i_o$ may be a discrete pulse signal and may be applied to the inverter controller 430. Thus, the inverter switching control signal Sic is generated based on the detected output current $i_o$. The following description may explain that the detected output current $i_o$ is the three-phase output currents $i_a$, $i_b$, and $i_c$.

The output voltage detector F is located between the inverter 420 and the motor 230 and detects an output voltage applied from the inverter 420 to the motor 230. When the inverter 420 is operated by a PWM based switching control signal, the output voltage may be a PWM based pulse voltage.

In order to detect the PWM based pulse voltage, the output voltage detector F may include a resistor electrically connected between the inverter 420 and the motor 230 and a comparator connected to one terminal of the resistor. A detailed description of the output voltage detector F will be given later with reference to FIG. 8a.

The detected PWM based output voltage $v_o$ may be a discrete pulse signal and may be applied to the inverter controller 430. The inverter switching control signal Sic is generated based on the detected output voltage $v_o$. The following description may explain that the detected output voltage $v_o$ is the three-phase output voltage va, vb, and vc.

Meanwhile, the three-phase motor 230 includes a stator and a rotor. An AC power voltages of a predetermined frequency is applied to a coil of the stator of each phase (each of phases a, b, and c), thereby rotating the rotor.

The motor 230 may include, for example, a Surface Mounted Permanent Magnet Synchronous Motor (SMPMSM), an Interior Permanent Magnet Synchronous Magnet Synchronous Motor (IPMSM), or a Synchronous Reluctance Motor (SynRM). Among these motors, the SMPMSM and the IPMSM are Permanent Magnet Synchronous Motors (PMSMs) including a permanent magnet and the SynRM contains no permanent magnet.

If the converter 410 includes a switching element, the inverter controller 430 may control a switching operation of the switching element in the converter 410. To this end, the inverter controller 430 may receive the input current $i_s$ detected by the input current detector A.

In order to control the switching operation of the converter 410, the inverter controller 430 may output a converter switching control signal Scc (not shown) to the converter 410. The converter switching control signal Scc may be a PWM switching control signal and may be generated based on the input current $i_s$ detected by the input current detector A.

Figure 5:
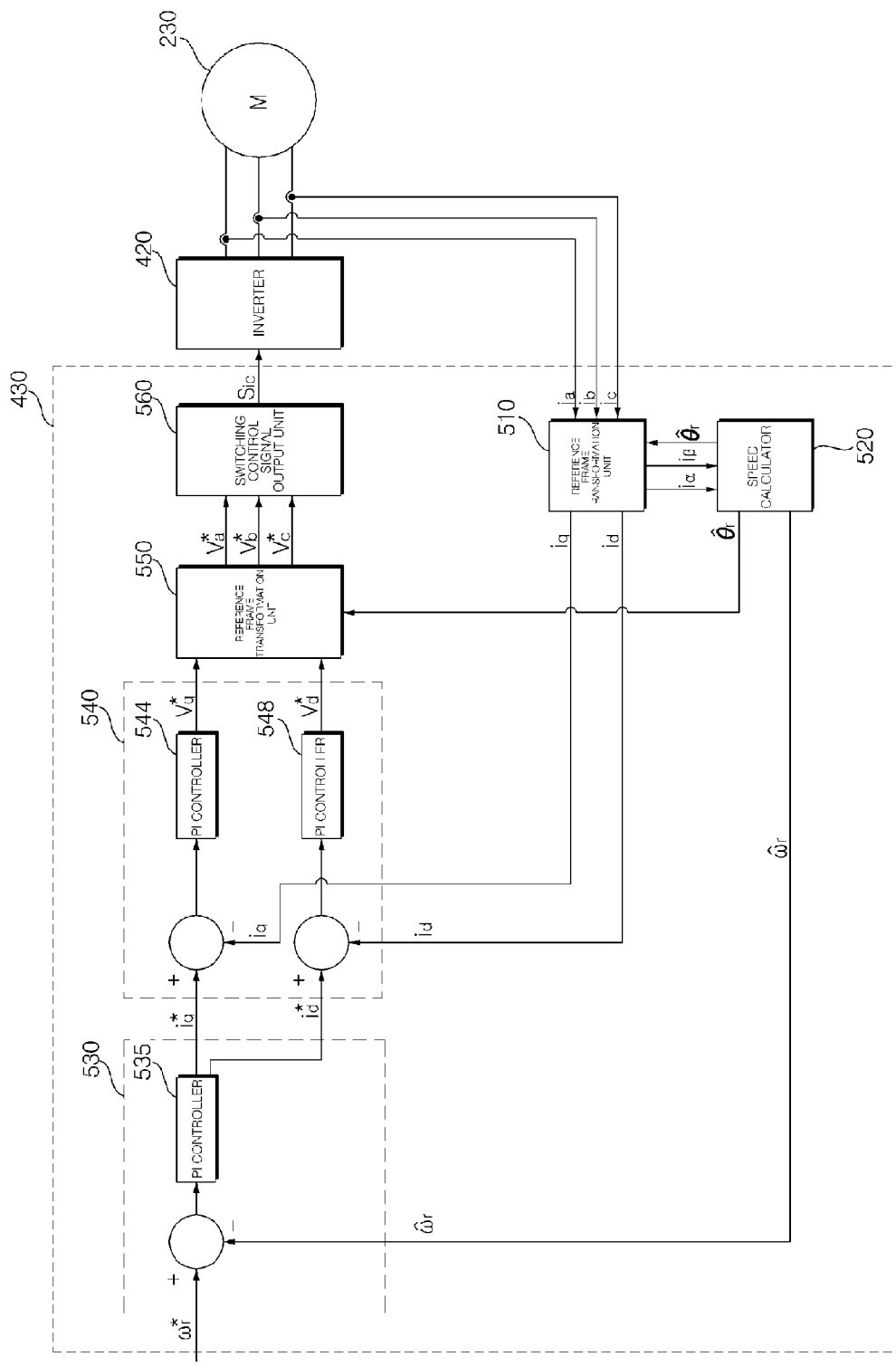
FIG. 5 is a block diagram of the inner configuration of the inverter controller shown in FIG. 4.

FIG. 5 is a block diagram of the inner configuration of the inverter controller shown in FIG. 4.

Referring to FIG. 5, the inverter controller 430 may include an axis transformer 510, a velocity calculator 520, a current instruction generator 530, a voltage instruction generator 540, an axis transformer 550, and a switching control signal output unit 560.

The axis transformer 510 may receive output currents $i_a$, $i_b$, and $i_s$ detected by the output current detector E and convert the same into two-phase currents $i_\alpha$ and $i_\beta$ of the stationary coordinate system and two-phase currents $i_d$ and $i_q$ of the rotating coordinate system.

The axis transformer 510 may externally output the two-phase currents $i_\alpha$ and $i_\beta$ of the stationary coordinate system, two-phase voltages $v_\alpha$ and $v_\beta$ of the stationary coordinate system, the two-phase current $i_d$ and $i_q$ of the rotating coordinate system, and two-phase voltages $v_d$ and $v_q$ of the rotating coordinate system.

The velocity calculator 520 may receive the two-phase currents $i_s$ and $i_s$ of the stationary coordinate system and the two-phase voltages $v_\alpha$ and $v_\beta$ of the stationary coordinate system, which have been axis-transformed by the axis transformer 510, and calculate a rotor position θ and velocity w of the motor 230.

The current instruction generator 530 generates a current instruction value $i^*_q$ based on calculated velocity $\hat{\omega}_r$ and a velocity instruction value $\omega^*_r$. For example, the current instruction generator 530 may generate the current instruction value $i^*_q$ based on a difference between the calculated velocity w r and the velocity instruction value $\omega^*_r$ while a Proportional Integral (PI) controller 535 implements PI control. Although FIG. 5 illustrates the q-axis current instruction value $i^*_q$, a d-axis current instruction value $i^*_d$ may be further generated. The d-axis current instruction value $i^*_d$ may be set to 0.

The current instruction generator 530 may include a limiter (not shown) that limits the level of the current instruction value $i^*_q$ to prevent the current instruction value $i^*_q$ from exceeding an allowable range.

Next, the voltage instruction generator 540 may generate d-axis and q-axis voltage instruction values $v^*_d$ and $v^*_q$ based on the d-axis and q-axis currents $i_d$ and $i_q$, which have been axis-transformed into a two-phase rotating coordinate system by the axis transformer and on the current instruction values $i^*_d$ and $i^*_q$ from the current instruction generator 530. For example, the voltage instruction generator 540 may generate the q-axis voltage instruction value $v^*_q$ based on a difference between the q-axis current $i_q$ and the q-axis current instruction value $i^*_q$ while a PI controller 544 implements PI control. In addition, the voltage instruction generator 540 may generate the d-axis voltage instruction value $v^*_d$ based on a difference between the d-axis current $i_d$ and the d-axis current instruction value $i^*_d$ while a PI controller 548 implements PI control. The d-axis voltage instruction value $v^*_d$ may be set to 0 to correspond to the d-axis current instruction value that that is set to 0.

The voltage instruction generator 540 may include a limiter (not shown) that limits the level of the d-axis and q-axis voltage instruction values $v^*_d$ and $v^*_q$ to prevent these voltage instruction values $v_d$ and $v^*_q$ from exceeding an allowable range.

The generated d-axis and q-axis voltage instruction values $v^*_d$ and $v^*_q$ may be input to the axis transformer 550.

The axis transformer 550 receives the calculated position $\hat{\theta}$ from the velocity calculator 520 and the d-axis and q-axis voltage instruction values $v^*_d$ and $v^*_q$ to implement axis transformation of the same.

First, the axis transformer 550 implements transformation from a two-phase rotating coordinate system into a two-phase stationary coordinate system. In this case, the position $\hat{\theta}_r$ calculated from the velocity calculator 520 may be used.

The axis transformer 550 performs transformation from the two-phase stationary coordinate system into a three-phase stationary coordinate system. Through this transformation, the axis transformer 550 outputs three-phase output voltage instruction values $v^*a$, $v^*_b$, and $v^*_c$.

The switching control signal output unit 560 generates a PWM inverter switching control signal Sic based on the three-phase output voltage instruction values $v^*_a$, $v^*_b$, and $v^*_c$.

The output inverter switching control signal Sic may be converted into a gate drive signal by a gate drive unit (not shown) and may then be input to a gate of each switching element included in the inverter 420. Thereby, the respective switching elements Sa, S'a, Sb, S'b, Sc, and S'c of the inverter 420 may perform a switching operation.

Figure 6:
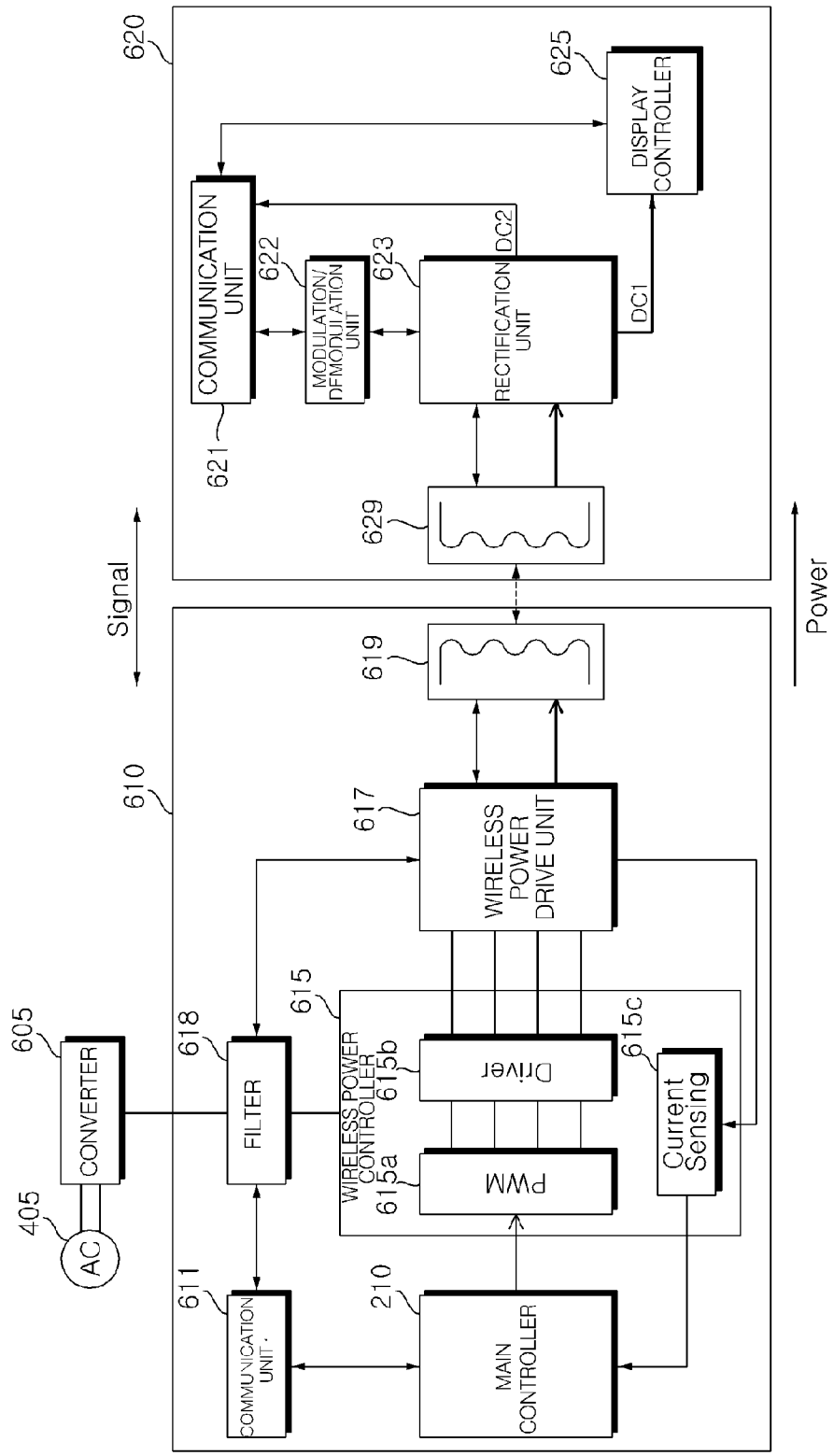
FIG. 6 is a block diagram of the inner configuration of a first circuit unit and a second circuit unit of a home appliance according to an embodiment of the present invention.

FIG. 6 is a block diagram of the inner configuration of a first circuit unit and a second circuit unit of a home appliance according to an embodiment of the present invention.

Referring to FIG. 6, a home appliance may include a first circuit unit 610 including the main controller 210 for controlling the drive unit 220 and a second circuit unit 620 including a display controller 625 for controlling the display unit 118.

The first circuit unit 610 is operated by a DC power voltage and the DC power voltage may be supplied by a converter 605 that converts an AC power voltage output from the AC power source 405 into the DC power voltage.

The first circuit unit 610 may wirelessly transmit the DC power voltage output from the converter 605 to the second circuit unit 620, using a first coil 619.

The first circuit unit 610 may wirelessly transmit data received from the main controller 210, for example, data such as remaining washing time information and washing course information to the second circuit unit 620, using the first coil 619.

The second circuit unit 620 may wirelessly transmit data input from the input unit or the display to the first circuit unit 610 using a second coil 629.

In this case, the first circuit unit 610 may wirelessly transmit wireless to the second circuit unit 620 using a first frequency and the second circuit unit 620 may wirelessly transmit data to the first circuit unit 610 using a second frequency different from the first frequency. Thereby, wireless power transmission and bidirectional communication are possible between the circuit units 610 and 620.

The first circuit unit 610 and the second circuit unit 620 desirably perform frequency division multiplex (FDM) based communication rather than amplitude modulation (AM) based communication.

In particular, the first circuit unit 610 and the second circuit unit 620 may simultaneously perform bidirectional communication using different frequencies. Therefore, time consumed during data exchange is shortened.

The first circuit unit 610 and the second circuit unit 620 may perform wireless power transmission/reception and data transmission/reception using the respective coils 619 and 629, thereby increasing operation efficiency. Further, manufacturing costs are reduced and, especially, wireless communication can be performed without an additional antenna.

If the second circuit unit 620 is attached to a door that can be opened and closed, since wireless power transmission to the second circuit unit 620 is performed, abrasion of wires and deterioration of aesthetics are prevented.

The first circuit unit 610 may include the first coil 619 used to perform wireless power transmission to the second circuit unit 620 and perform data reception from the second circuit unit 620 and the second circuit unit 620 may include the second coil 629 used to perform wireless power reception from the first circuit unit 610 and perform data transmission to the first circuit unit 610.

The first circuit unit 610 may include the first coil 619 used to perform wireless power transmission to the second circuit unit 620 and data reception from the second circuit unit 620, a wireless power drive unit 617 to drive the first coil 619, and a wireless power controller 615 to control the wireless power drive unit 617.

The wireless power drive unit 617 in the first circuit unit 610 may convert a DC power voltage into an AC power voltage and the first coil 619 in the first circuit unit 610 may perform wireless power transmission using the converted AC power voltage.

The first circuit unit 610 may further include a filter 618 to filter data received through the first coil 619 and the wireless power drive unit 617 upon receiving data from the second circuit unit 620. The filter 618 may be a band pass filter.

The first circuit unit 610 may further include a communication unit 611 to exchange data with the second circuit unit 620 and the wireless power controller 615 may control the communication unit 611 to control transmission of a data signal to the first coil 619.

The main controller 210 may control wireless power transmission through the first coil 619 when the DC power voltage output from the converter 605 is supplied to the wireless power drive unit 617 during wireless power transmission. In this case, the wireless power drive unit 617 may convert the DC power voltage into an AC power voltage for wireless power transmission of the DC power voltage.

To convert the DC power voltage into the AC power voltage, the wireless power drive unit 617 may be controlled by the wireless power controller 615.

To this end, the wireless power controller 615 may include a PWM generator 615a to generate a PWM signal and a driver 615b to generate a drive signal based on the PWM signal.

The wireless power controller 615 may further include a current sensor 615c to sense current flowing into the wireless power drive unit 617 and transmit sensed current information to the main controller 210. The main controller 210 may determine a duty of the PWM signal based on the sensed current information.

The main controller 210 may control the communication unit 611 upon transmitting data to control wireless transmission of a data signal in the communication unit 611 to the second circuit unit 620 through the filter 618, the wireless power drive unit 617, and the first coil 619. In this case, the data signal may not pass through the filter 618.

Meanwhile, the second circuit unit 620 may include the second coil 629 used to perform wireless power reception from the first circuit unit 610 and data transmission to the first circuit unit 610 and a rectification unit 623 to rectify wireless power received through the second coil 629. The display controller 625 may be operated based on a voltage input from the rectification unit 623.

The second circuit unit 620 may further include a modulation/demodulation unit 622 to modulate and demodulate a data signal received from the rectification unit 623 and a communication unit 621 to extract data from a signal demodulated by the modulation/demodulation unit 622.

The modulation/demodulation unit 622 may perform Resistor-Capacitor (RC) modulation or RC demodulation based on resistors and capacitors.

The display controller 625 may control transmission of a data signal from the communication unit 611 to the second coil 629 during data transmission to the first circuit unit 610.

When data is received from the second circuit unit 620, a signal received through the first coil 619 may be transmitted to the filter 618 via the wireless power drive unit 617, may be band pass filtered in the filter 618, and then may be transmitted to the communication unit 611.

The communication unit 611 may process a received signal and transmit the processed signal to the main controller 210.

Meanwhile, wireless power transmitted to the second circuit unit 620 may be supplied to the second coil 629 and the rectification unit 623 and a rectified voltage DC1 may be supplied to the display controller 625.

Data transmitted to the second circuit unit 620 may be supplied to the display controller 625 via the second coil 629, the rectification unit 623, the modulation/demodulation unit 622, and the communication unit 621.

Meanwhile, data transmitted by the second circuit unit 620 may be transmitted to the second coil 629 via the display controller 625, the communication unit 621, the modulation/demodulation unit 622, and the rectification unit 623 and may be wirelessly transmitted through the second coil 629.

FIGS. 7 to 10b are views referred to for explaining operations of the first circuit and the second circuit of FIG. 6.

Figure 7:
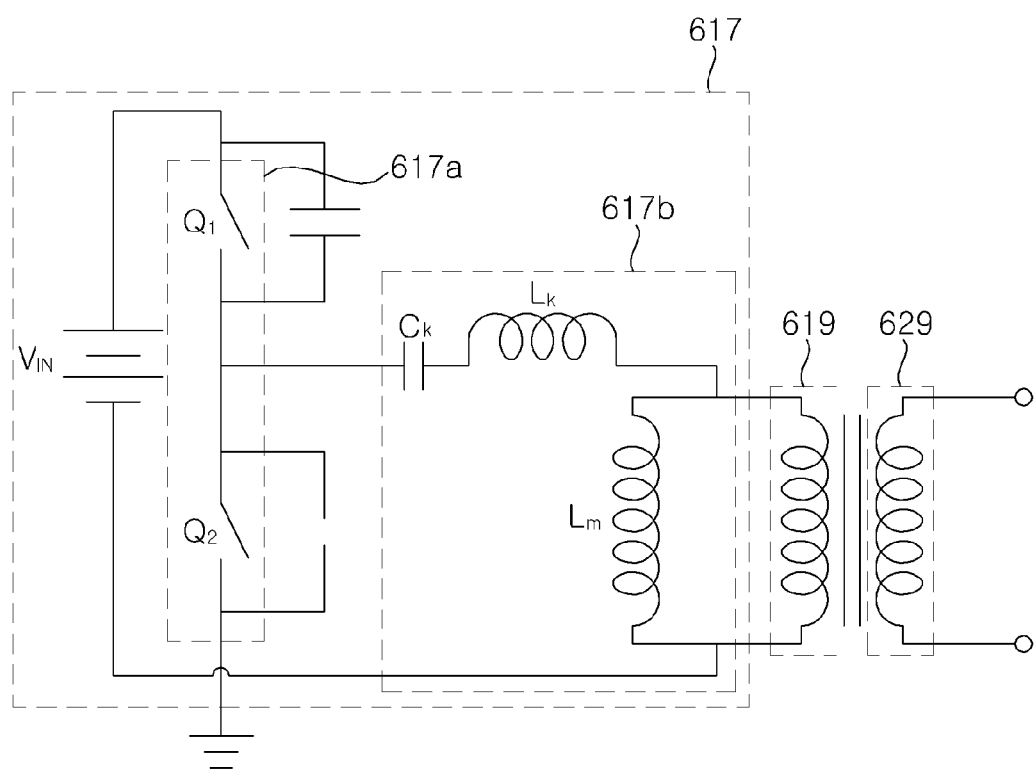
FIGS. 7 to 10b are views referred to for explaining operations of the first circuit and the second circuit of FIG. 6.

FIG. 7 shows an example of the wireless power drive unit shown in FIG. 6.

Referring to FIG. 7, the wireless power drive unit 617 may include a switching unit 617a including switching elements $Q_1$ and $Q_2$ to convert a DC power voltage into an AC power voltage and a resonance unit 617b including resonant elements $C_k$, $L_k$, and $L_m$, for Inductor-Inductor-Capacitor (LLC) resonance.

If the switching elements Q1 and Q2 are Insulated Gate Bipolar Transistors (IGBTs), a gate drive signal may be output from the driver 615b in the wireless power controller 615 and may be input to gate terminals of the switching elements Q1 and Q2. The switching elements Q1 and Q2 may perform a switching operation based on the gate drive signal.

Figure 8A:
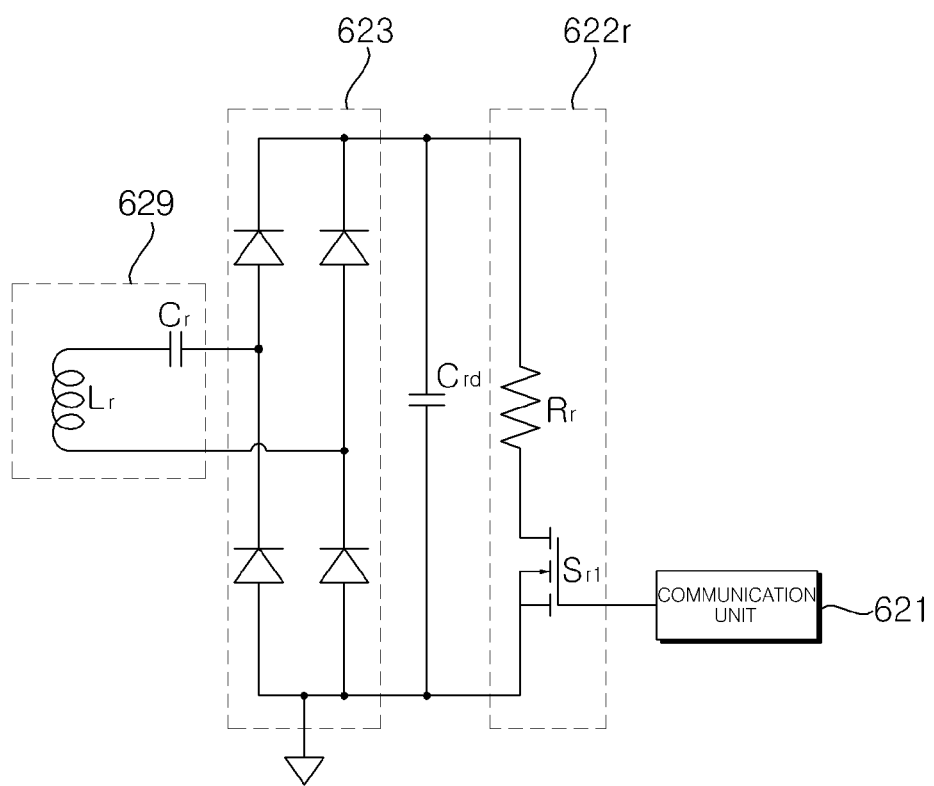
Figure 8B:
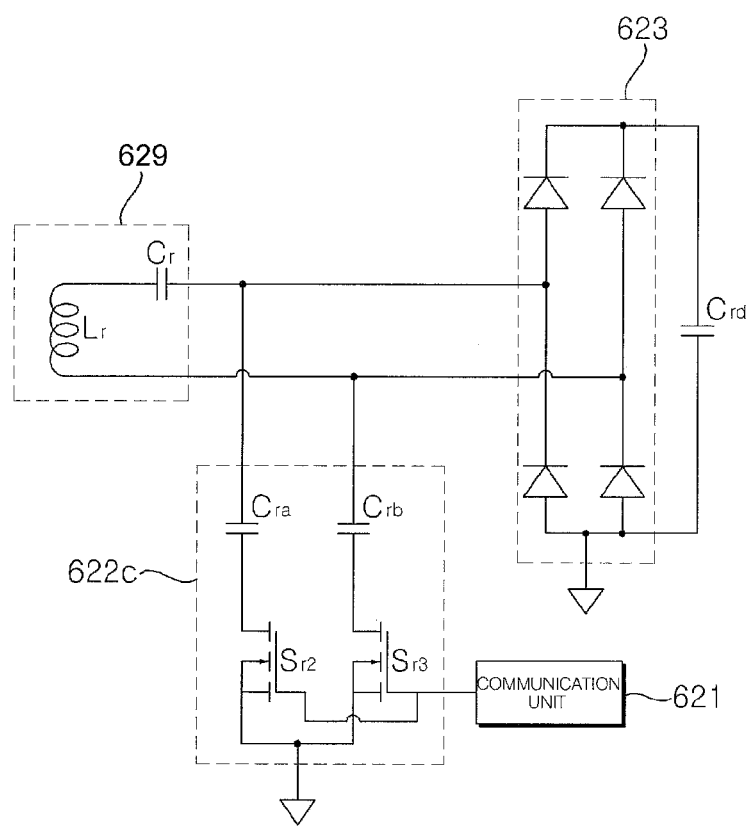

FIGS. 8a and 8b show various examples of the modulation/demodulation unit in the second circuit unit shown in FIG. 6.

First, FIG. 8a shows that the modulation/demodulation unit 622 in the second circuit unit 620 includes a switching unit 622r including a resistor $R_r$ and a switching element $S_{r1}$ to perform R modulation or R demodulation.

If the switching element Sr1 is an IGBT, a gate drive signal may be output from the communication unit 621 and may be input to a gate terminal of the switching element $S_{r1}$. The switching element $S_{r1}$ may perform a switching operation according to the gate drive signal.

Meanwhile, the second coil 629 and the rectification unit 623 may be located at a front terminal of the switching unit 622r. In FIG. 8a, a full-bridge diode rectifier is shown as the rectification unit 623.

Next, in FIG. 8b, the modulation/demodulation unit 622 in the second circuit unit 620 includes a switching unit 622c including capacitors $C_{ra}$ and $C_{rb}$ and switching elements $S_{r2}$ and $S_{r3}$ to perform C modulation or C demodulation.

If the switching elements $S_{r2}$ and $S_{r3}$ are IGBTs, the gate drive signal may be output from the communication unit 621 and may be input to gate terminals of the switching elements $S_{r2}$ and $S_{r3}$. The switching elements $S_{r2}$ and $S_{r3}$ may perform a switching operation based on the gate drive signal.

Meanwhile, the second coil 629 is located at a front terminal of the switching unit 622c and the rectification unit 623 may be located at a rear terminal of the switching unit 622c. In FIG. 8b, a full-bridge diode rectifier is shown as the rectification unit 623.

The switching unit 622r of FIG. 8a and the switching unit 622c of FIG. 8b may be operatively arranged together.

In more detail, the switching unit 622c shown in FIG. 8b may be located between the second coil 629 and the rectification unit 623 and the switching unit 622r shown in FIG. 8a may be arranged at both output terminals of each of the rectification unit 623 and the capacitor $C_{rd}$. Thereby, RC modulation or RC demodulation may be performed.

Figure 9A:
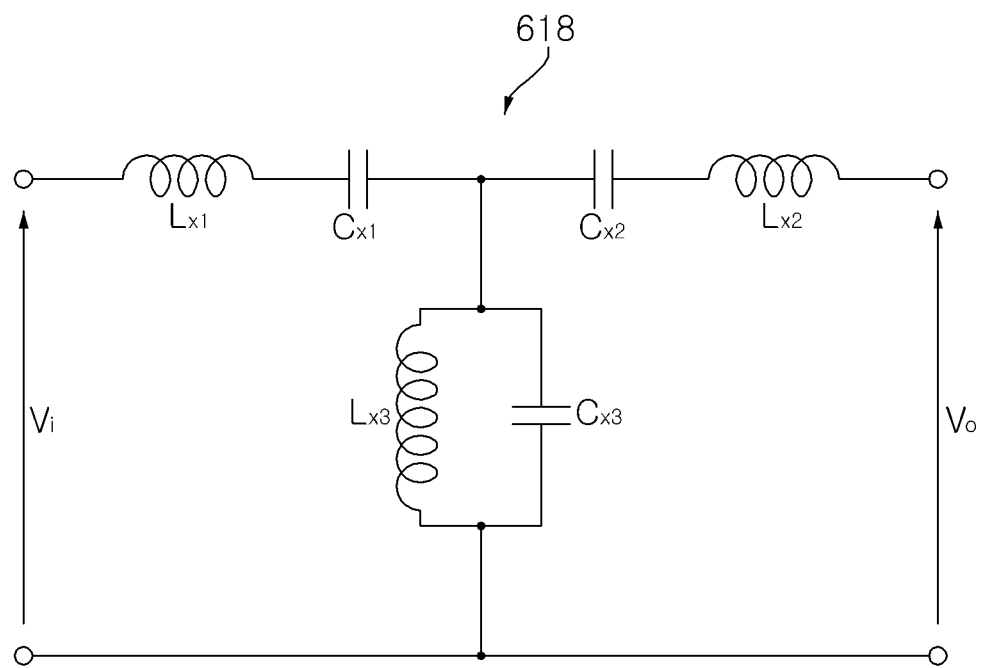

FIG. 9a is a circuit diagram of the filter 618 shown in the first circuit unit 610.

For band pass filtering, the filter 618 may include capacitive elements $C_{x1}$, $C_{x2}$, and $C_{x3}$ and inductive elements $L_{x1}$, $L_{x2}$, and $L_{x3}$.

The inductive element $L_{x3}$ and the capacitive element $C_{x3}$ are connected in parallel between a point, which connects the serially connected inductive element $L_{x1}$ and capacitive element $C_{x1}$ to the serially connected inductive element $L_{x2}$ and capacitive element $C_{x2}$, and a ground terminal.

Figure 9B:
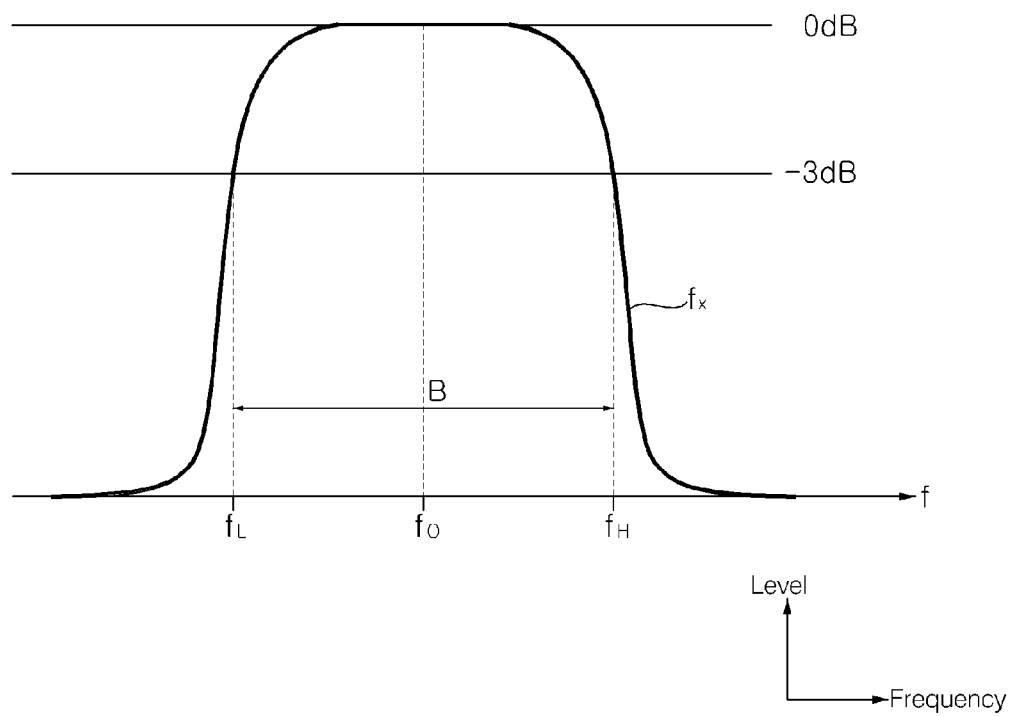

FIG. 9b is a view showing a frequency characteristic of the filter of FIG. 9a.

As shown in FIG. 9b, the filter 618 of FIG. 9a may perform band pass filtering having bandwidth (B) between $f_L$ and $f_H$ by a cutoff frequency of 3 dB.

Figure 10A:
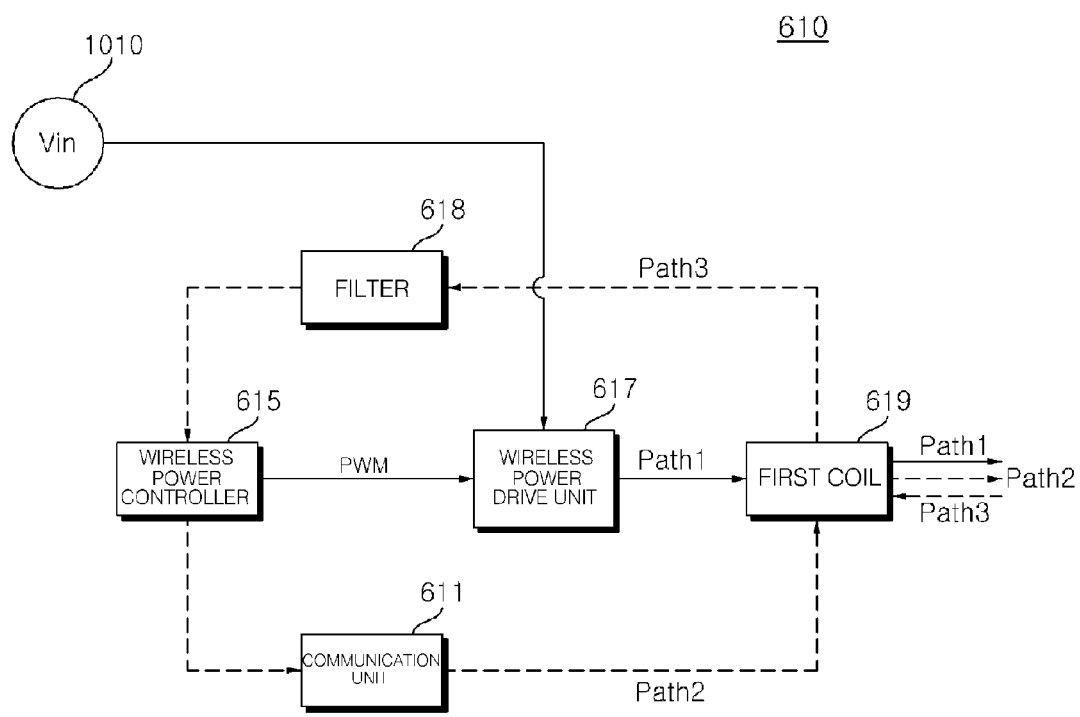

FIG. 10a is a diagram referred to for explaining operation of the first circuit unit.

Referring to FIG. 10a, when the first circuit unit 610 performs wireless power transmission, the wireless power drive unit 617 may convert a DC power voltage Vin 1010 into an AC power voltage and wireless power may be transmitted to the second circuit unit 620 via the first coil 619. That is, wireless power is transmitted via a path Path1.

Next, when the first circuit unit 610 transmits data, the data may be wirelessly transmitted to the second circuit unit 620 via a path Path2 of the wireless power controller 615, the communication unit 611, and the first coil 619.

When the first circuit unit 610 receives data, the data may be wirelessly received from the second circuit unit 620 via a path Path3 of the first coil 619, the filter 618, and the wireless power controller 615.

Figure 10B:
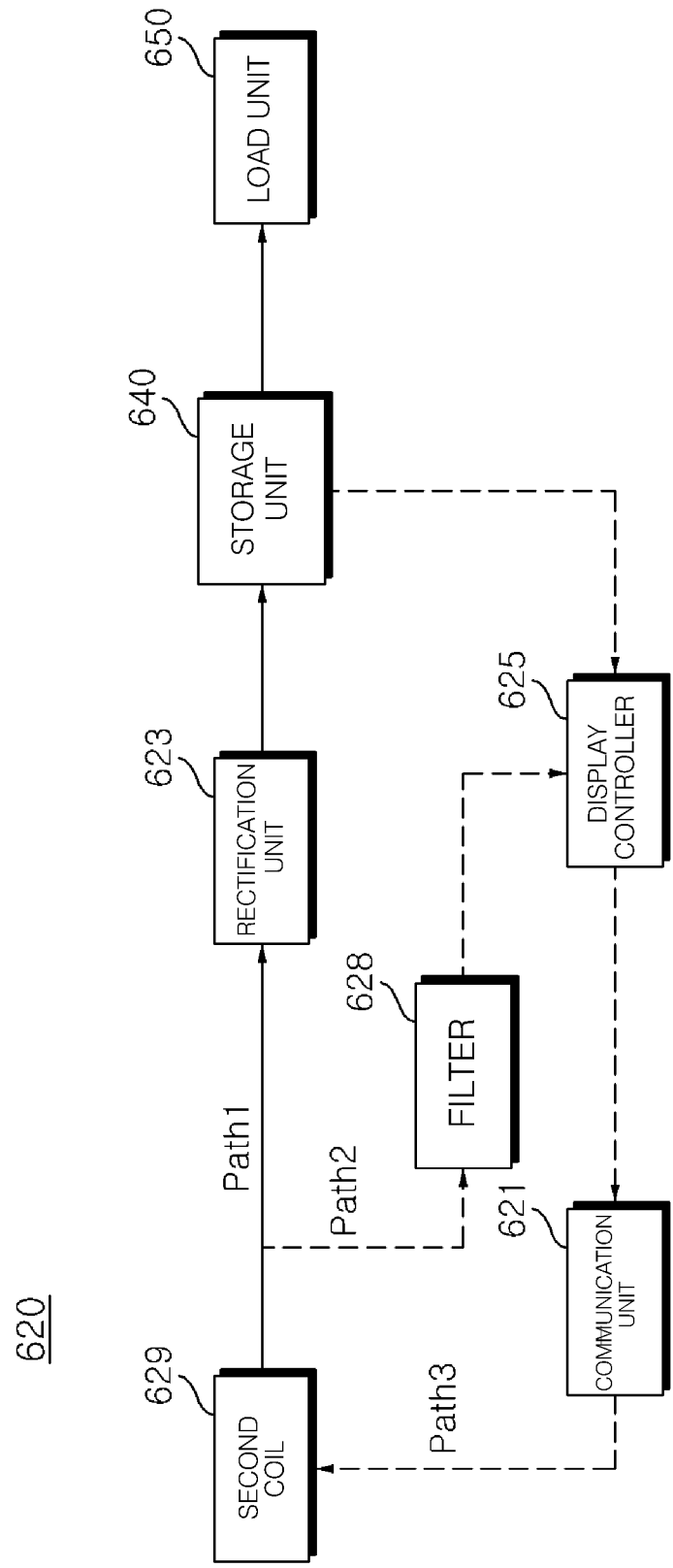

FIG. 10b is a diagram referred to for explaining operation of the second circuit.

Referring to FIG. 10b, when wireless power is received from the first circuit unit 610, wireless power may be received by the display controller 625 via a path Path1 of the second coil 629, the rectification unit 623, a storage unit 640, and the display controller 625. In this case, a path of the storage unit 640 may be omitted. A load unit 650 may be connected to the storage unit 640.

When data is received from the first circuit unit 610, the data may be received by the display controller 625 via a path Path2 of the second coil 629, the filter 628, and the display controller 625.

When data is transmitted to the first circuit unit 610, the data may be wirelessly transmitted to the first circuit unit 610 via a path Path3 of the display controller 625, the communication unit 621, and the second coil 629.

Figure 11:
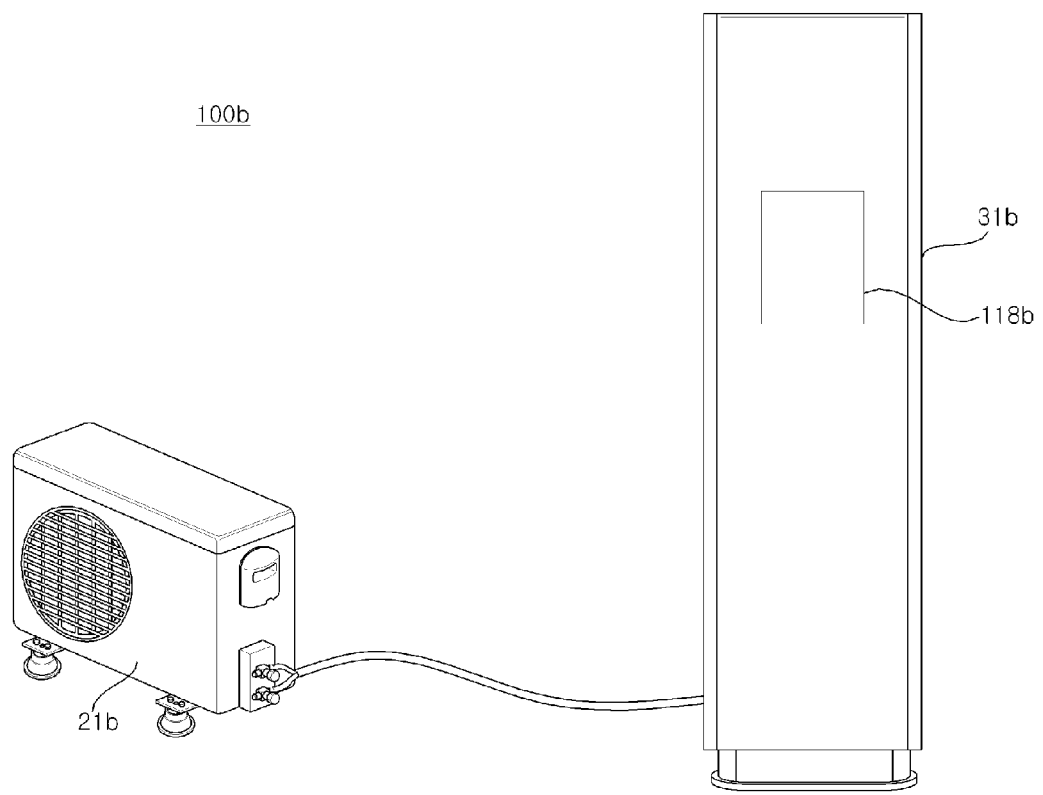
FIG. 11 is a perspective view showing an air conditioner, which is another exemplary home appliance, according to an embodiment of the present invention.

FIG. 11 is a perspective view showing an air conditioner, which is another exemplary home appliance, according to an embodiment of the present invention.

An air conditioner 100b according to the present invention may include an indoor unit 31b and an outdoor unit 21b connected to the indoor unit 31b as illustrated in FIG. 11.

The indoor unit 31 of the air conditioner 100b may be any one of a stand type indoor unit, a wall mount type indoor unit, and a ceiling type indoor unit. In FIG. 11, the stand type indoor unit 31b is shown.

Meanwhile, the air conditioner 100 may include at least one of a ventilator, an air purifier, a humidifier, and a heater, which may be operatively connected to the indoor unit 31b and the outdoor unit 21b.

The outdoor unit 21 includes a compressor (not shown) for compressing a refrigerant, an outdoor heat exchanger (not shown) for performing heat exchange between the refrigerant and outdoor air, an accumulator (not shown) for extracting a gas refrigerant component from the refrigerant and supplying the extracted gas refrigerant component to the compressor, and a four-way valve (not shown) for changing a flow channel of the refrigerant based on a heating operation. In addition, the outdoor unit 21b may further include a plurality of sensors, a valve, and an oil collector, descriptions of which will be omitted.

The outdoor unit 21a operates the compressor and the outdoor heat exchanger to compress the refrigerant or perform heat exchange with the refrigerant based on set conditions and supply the compressed refrigerant or the heat-exchanged refrigerant to the indoor unit 31b. The outdoor unit 21b may be driven according to demand of a remote controller (not shown) or the indoor unit 31b. A cooling/heating capacity of the air conditioner is changed based on the indoor unit which is driven. Therefore, it is possible to change the number of driven outdoor units and the number of driven compressors installed in an outdoor unit.

The outdoor unit 21b supplies the compressed refrigerant to the indoor unit 31b connected thereto.

The indoor unit 31b receives the refrigerant from the outdoor unit 21b and discharges cool or hot air into a room in which the indoor unit 31b is installed. The indoor unit 31b includes an indoor heat exchanger (not shown), an indoor fan (not shown), an expansion valve (not shown) for expanding the refrigerant, and a plurality of sensors (not shown).

The outdoor unit 21b and the indoor unit 31b may be connected to each other via a communication cable to transmit and receive data to and from each other. In addition, the outdoor unit 21b and the indoor unit 31b may be connected to the remote controller (not shown) by wire or wirelessly such that the outdoor unit 21b and the indoor unit 31b can be operated under control of the remote controller (not shown).

The remote controller (not shown) may be connected to the indoor unit 31b to allow a user to input a control command for controlling the indoor unit 31b and to receive and display state information of the indoor unit 31b.

Meanwhile, a display unit 118b may be located on a front panel of the indoor unit 31b. That is, the display unit 118b may be located on the front panel that can be opened and closed for filter exchange.

As described above, when the display unit 118b is located on the front panel of the indoor unit 31b, the display controller 625 for controlling the display unit 118b may be provided in the second circuit unit 620 and the main controller 210 may be provided in the first circuit unit 610 as illustrated in FIG. 6.

In addition, wireless power transmission and data exchange may be performed between the first circuit unit 610 and the second circuit unit 620 as described previously.

Figure 12:
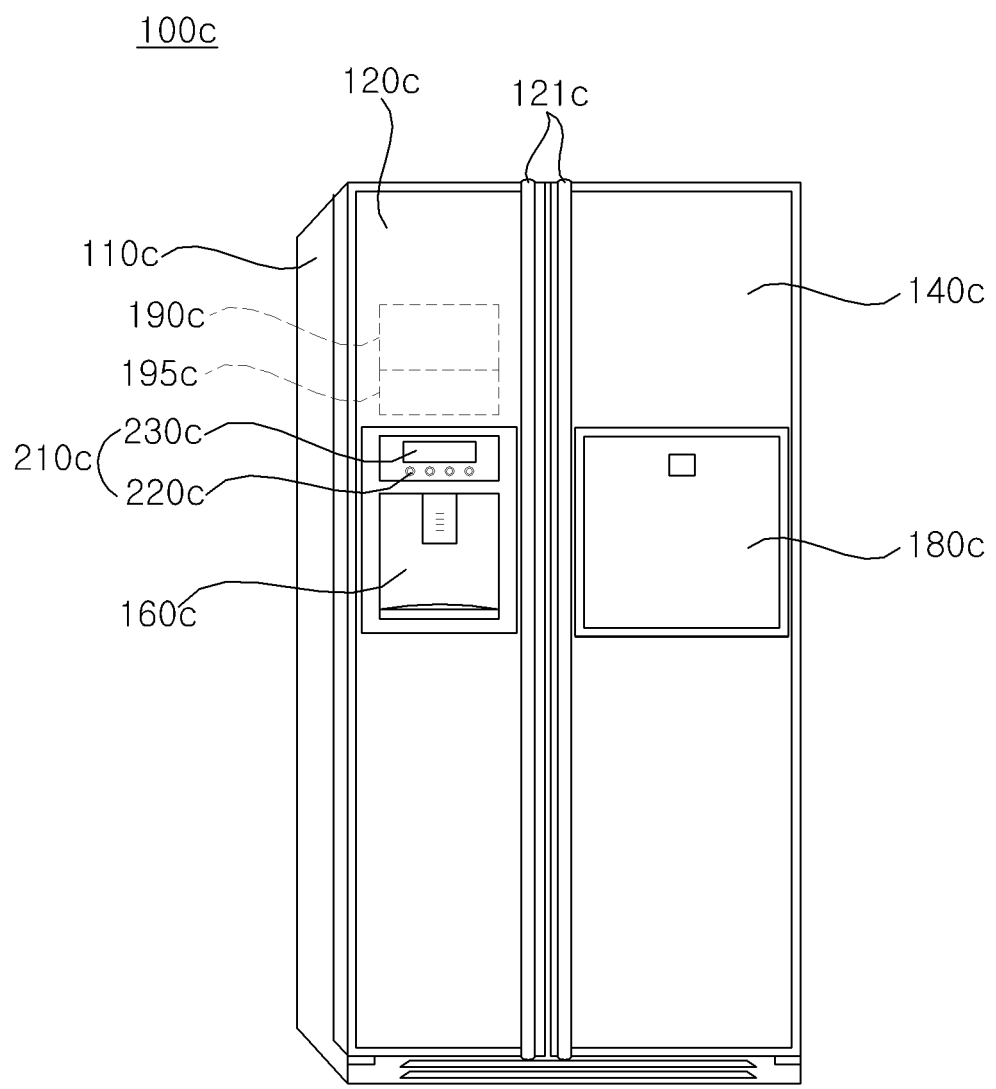
FIG. 12 is a perspective view showing a refrigerator, which is still another exemplary home appliance, according to an embodiment of the present invention.

FIG. 12 is a perspective view showing a refrigerator, which is still another exemplary home appliance, according to an embodiment of the present invention.

Referring to FIG. 12, a refrigerator 100c related to the present invention includes a case 110c, which has an inner space divided into a freezing compartment and a refrigerating compartment (not shown), a freezing compartment door 120c to shield the freezing compartment, and a refrigerating compartment door 140c to shield the refrigerating compartment, the case 110c, the freezing compartment door 120c, and the refrigerating door 140c defining an outer appearance of the refrigerator 100c.

The freezing compartment door 120c and the refrigerating compartment door 140c may be provided at front surfaces thereof with forwardly protruding door handles 121c respectively to assist a user in easily pivoting the freezing compartment door 120c and the refrigerating compartment door 140c by gripping the door handles 121c.

The refrigerating compartment door 140c may further be provided at a front surface thereof with a so-called home bar 180c that allows the user to conveniently retrieve stored items, such as beverages, without opening the refrigerating compartment door 140c.

The freezing compartment door 120c may further be provided at a front surface thereof with a dispenser 160c that allows the user to easily and conveniently retrieve ice or drinking water without opening the freezing compartment door 120c. The freezing compartment door 120c may further be provided with a control panel 210c at the upper side of the dispenser 160c. The control panel 210c serves to control driving operation of the refrigerator 100c and to display a current operating state of the refrigerator 100c.

As described above, if the control panel 210c is arranged on the freezing compartment door 120c, the display controller 625 for controlling the control panel 210c may be arranged in the second circuit unit 620 and the main controller 210 may be arranged in the first circuit unit 610 as described with reference to FIG. 6.

In addition, wireless power transmission and data exchange may be implemented between the first circuit unit 610 and the second circuit unit 620 as described above.

While the dispenser 160c is shown in FIG. 12 as being located at the front surface of the freezing compartment door 120c, the present invention is not limited thereto and the dispenser 160c may be located at the front surface of the refrigerating compartment door 140c.

Meanwhile, the freezing compartment may accommodate, in an upper region thereof, an icemaker 190c used to make ice using water supplied thereto and cold air within the freezing compartment and an ice bank 195c mounted within the freezing compartment to receive ice released from the icemaker 190c. In addition, although not shown in FIG. 12, an ice chute (not shown) may further be provided to guide the ice received in the ice bank 195c to fall into the dispenser 160c.

The control panel 210c may include an input unit 220c having a plurality of buttons and a display 230c to display control screens, operating states, and the like.

The display 230c displays control screens, operating states, and other information, such as an internal temperature of the refrigerator. For example, the display 230c may display a service type of the dispenser 160c (ice cubes, water, crushed ice), a setting temperature of the freezing compartment, and a setting temperature of the refrigerating compartment.

The display 230c may be any one of a Liquid Crystal Display (LCD), a Light Emitting Diode (LED), and an Organic Light Emitting Diode (OLED). In addition, the display 230c may be a touchscreen that may additionally perform a function of the input unit 220c.

The input unit 220c may include a plurality of manipulation buttons. For example, the input unit 220c may include a dispenser setting button (not shown) to set a service type of the dispenser (ice cubes, water, crushed ice), a freezing compartment temperature setting button to set a temperature of the freezing compartment, and a refrigerating compartment temperature setting button to set a temperature of the refrigerating compartment. The input unit 220c may be a touchscreen that may additionally perform a function of the display 230c.

The refrigerator according to embodiments of the present invention is not limited to a double door type shown in FIG. 12 and may be any one of a one door type refrigerator, a sliding door type refrigerator, a curtain door type refrigerator, and others.

A home appliance according to an embodiment of the present invention includes a motor, a drive unit configured to drive the motor, a first circuit unit including a main controller configured to control the drive unit, a display unit, and a second circuit unit including a display controller configured to control the display unit, wherein the first circuit unit transmits wireless power to the second circuit unit, using a first frequency, and the second circuit unit transmits data to the first circuit unit, using a second frequency different from the first frequency, thereby performing wireless power transmission and bidirectional communication between the first and second circuit units.

The first circuit unit and the second circuit unit perform bidirectional communication using different frequencies, thereby shortening time for data exchange.

Each of the first circuit unit and the second circuit unit includes one coil used to transmit/receive wireless power and transmit/receive data, thereby increasing operation efficiency. Furthermore, manufacturing costs are reduced and, especially, wireless communication can be performed without an additional antenna.

When the second circuit unit is attached to a door configured to be opened or closed, since wireless power transmission to the second circuit unit is performed without wires, abrasion of wires and deterioration of esthetics can be prevented.

A home appliance according to another embodiment of the present invention includes a motor, a drive unit configured to drive the motor, a first circuit unit including a main controller configured to control the drive unit, a display unit, a door configured to be opened or closed, and a second circuit unit including a display controller configured to control the display unit, the second circuit being attached to the door and receiving wireless power from the first circuit unit, thereby performing wireless power transmission and bidirectional communication between the first and second circuit units. In addition, since wireless power transmission to the second circuit unit is performed without wires, abrasion of wires and deterioration of aesthetics can be prevented.

The home appliance according to embodiments of the present invention should not be limited to configurations and methods of the above-described embodiments and all or some of the embodiments may be selectively combined with one another to achieve various alterations.

The operation method of the home appliance according to the present invention may be implemented as processor-readable code that can be written on a processor-readable recording medium included in the home appliance. The processor-readable recording medium may be any type of recording device in which data that can be read by a processor is stored.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A home appliance comprising:
   a motor;
   a drive circuit configured to drive the motor;
   a first circuit including a main controller configured to control the drive circuit;
   a display module; and
   a second circuit including a display controller configured to control the display module, the second circuit being wirelessly coupled to the first circuit,
   wherein the first circuit wirelessly transmits power to the second circuit using a first frequency, and the second circuit wirelessly transmits data to the first circuit using a second frequency different from the first frequency.
2. The home appliance according to claim 1,
   wherein the first circuit includes a first coil that wirelessly transmits power to the second circuit and wirelessly receives data from the second circuit, and
   wherein the second circuit includes a second coil that wirelessly receives power from the first circuit and wirelessly transmits data to the first circuit.
3. The home appliance according to claim 1, wherein the first circuit and the second circuit perform bidirectional communication at the same time.

4. The home appliance according to claim 1,
wherein the first circuit includes:
a first coil that wirelessly transmits power to the second circuit and wirelessly receives data from the second circuit;
a wireless power drive circuit configured to drive the first coil; and
a wireless power controller configured to control the wireless power drive circuit,
wherein the second circuit includes:
a second coil that wirelessly receives power from the first circuit and wirelessly transmits data to the first circuit; and
a rectifier circuit configured to rectify wireless power received through the second coil,
wherein the display controller is operated based on power supplied from the rectifier circuit.

5. The home appliance according to claim 4, wherein the first circuit further includes a filter configured to filter data received through the first coil and the wireless power drive circuit upon receiving data from the second circuit.

6. The home appliance according to claim 5, wherein the filter is a band pass filter.

7. The home appliance according to claim 4,
wherein the wireless power drive circuit in the first circuit converts a direct current (DC) power voltage into an alternating current (AC) power voltage, and
wherein the first coil wirelessly transmits power using the converted AC power voltage.

8. The home appliance according to claim 1, further comprising a door configured to be opened or closed, wherein the second circuit is attached to the door.

9. The home appliance according to claim 8, further comprising an input module, wherein at least one of the input module and the display module is attached to the door.

10. The home appliance according to claim 1, wherein the home appliance is any one of a laundry treatment machine, a refrigerator, an air conditioner, or a cooking device.

11. A home appliance comprising:
a motor;
a drive circuit configured to drive the motor;
a first circuit including a main controller configured to control the drive circuit;
a display module;
a door configured to be opened or closed; and
a second circuit including a display controller configured to control the display module, the second circuit being attached to the door and wirelessly coupled to the first circuit to wirelessly receive power from the first circuit.

12. The home appliance according to claim 11, further comprising an input module, wherein at least one of the input module and the display module is attached to the door.

13. The home appliance according to claim 11,
wherein the first circuit includes a first coil that wirelessly transmits power to the second circuit and wirelessly receives data from the second circuit, and
wherein the second circuit includes a second coil that wirelessly receives power from the first circuit and wirelessly transmits data to the first circuit.

14. The home appliance according to claim 11, wherein the first circuit wirelessly transmits power to the second circuit using a first frequency, and the second circuit wirelessly transmits data to the first circuit using a second frequency different from the first frequency.

15. The home appliance according to claim 11, wherein the first circuit and the second circuit perform bidirectional communication.

16. The home appliance according to claim 11, wherein the home appliance is any one of a laundry treatment machine, a refrigerator, an air conditioner, or a cooking device.

* * * * *